US008768846B2

(12) United States Patent
DeLuca et al.

(10) Patent No.: US 8,768,846 B2
(45) Date of Patent: Jul. 1, 2014

(54) SYSTEM, METHOD, AND APPARATUS FOR MANAGEMENT OF MEDIA OBJECTS

(75) Inventors: Lisa Seacat DeLuca, San Francisco, CA (US); Pamela A Nesbitt, Tampa, FL (US); Amy D Travis, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1060 days.

(21) Appl. No.: 12/549,120

(22) Filed: Aug. 27, 2009

(65) Prior Publication Data

US 2011/0055175 A1    Mar. 3, 2011

(51) Int. Cl.
*G06F 21/00* (2013.01)
*G06F 7/00* (2006.01)

(52) U.S. Cl.
USPC ............................................. 705/51; 707/622

(58) Field of Classification Search
USPC ............................................. 705/51; 707/604
See application file for complete search history.

(56) References Cited

U.S. PATENT DOCUMENTS

| | | | | |
|---|---|---|---|---|
| 5,399,874 A * | 3/1995 | Gonsalves et al. | 250/556 |
| 5,668,897 A * | 9/1997 | Stolfo | 382/283 |
| 5,785,353 A * | 7/1998 | Diamond | 283/67 |
| 5,974,548 A * | 10/1999 | Adams | 713/186 |
| 6,233,684 B1 * | 5/2001 | Stefik et al. | 713/176 |
| 6,314,521 B1 * | 11/2001 | Debry | 726/10 |
| 6,351,815 B1 * | 2/2002 | Adams | 726/32 |
| 6,487,301 B1 * | 11/2002 | Zhao | 382/100 |
| 6,510,453 B1 * | 1/2003 | Apfel et al. | 709/206 |
| 6,567,530 B1 * | 5/2003 | Keronen et al. | 382/100 |
| 6,785,815 B1 * | 8/2004 | Serret-Avila et al. | 713/176 |
| 6,862,583 B1 * | 3/2005 | Mazzagatte et al. | 705/64 |
| 6,898,625 B2 * | 5/2005 | Henry et al. | 709/206 |
| 7,152,047 B1 * | 12/2006 | Nagel | 705/76 |
| 7,215,832 B1 * | 5/2007 | Yamaguchi | 382/305 |
| 7,236,610 B1 * | 6/2007 | Luo et al. | 382/100 |
| 7,373,330 B1 * | 5/2008 | Klebe | 705/51 |
| 7,383,441 B2 * | 6/2008 | Vorbruggen et al. | 713/176 |
| 8,091,025 B2 * | 1/2012 | Ramos et al. | 715/700 |
| 8,250,161 B2 * | 8/2012 | Malik | 709/206 |
| 2001/0051920 A1 * | 12/2001 | Joao et al. | 705/41 |
| 2002/0024714 A1 * | 2/2002 | Sandstrom et al. | 359/290 |
| 2002/0042884 A1 * | 4/2002 | Wu et al. | 713/201 |
| 2002/0052885 A1 * | 5/2002 | Levy | 707/200 |
| 2002/0091642 A1 * | 7/2002 | Rahnasto | 705/52 |
| 2002/0129238 A1 * | 9/2002 | Toh et al. | 713/153 |
| 2002/0152169 A1 * | 10/2002 | Dutta et al. | 705/45 |
| 2003/0023695 A1 * | 1/2003 | Kobata et al. | 709/206 |
| 2003/0037261 A1 * | 2/2003 | Meffert et al. | 713/201 |
| 2003/0093790 A1 * | 5/2003 | Logan et al. | 725/38 |
| 2003/0115544 A1 * | 6/2003 | Henry et al. | 715/500 |
| 2003/0182246 A1 * | 9/2003 | Johnson et al. | 705/76 |
| 2004/0022444 A1 * | 2/2004 | Rhoads | 382/232 |

(Continued)

*Primary Examiner* — Evens J Augustin
(74) *Attorney, Agent, or Firm* — Jeffrey T. Holman

(57) ABSTRACT

A computer program product that includes a computer useable storage medium to store a computer readable program for tracking media object data that, when executed on a computer, causes the computer to perform operations. The operations include storing usage data for a media object which is used in a first message. The usage data indicates historical usage of the media object by a user. The operations also include recalling the stored usage data for the media object in response to associating the media object with a second message. The operations also include communicating to the user the stored usage data corresponding to the media object prior to sending the second message with the media object to a recipient.

18 Claims, 9 Drawing Sheets

(56) References Cited

U.S. PATENT DOCUMENTS

| | | |
|---|---|---|
| 2004/0117627 A1* | 6/2004 | Brewington .................. 713/176 |
| 2005/0227678 A1* | 10/2005 | Agrawal et al. ............ 455/414.3 |
| 2006/0095502 A1* | 5/2006 | Lewis et al. .................. 709/203 |
| 2006/0200523 A1* | 9/2006 | Tokuda et al. ................ 709/206 |
| 2007/0100991 A1* | 5/2007 | Daniels et al. ............... 709/224 |
| 2007/0154190 A1* | 7/2007 | Gilley et al. .................. 386/125 |
| 2007/0156696 A1* | 7/2007 | Lim ................................. 707/9 |
| 2007/0198570 A1* | 8/2007 | Prahlad et al. ................ 707/102 |
| 2007/0226146 A1* | 9/2007 | Ruul ............................... 705/51 |
| 2007/0294533 A1* | 12/2007 | Toh et al. ...................... 713/170 |
| 2008/0022416 A1* | 1/2008 | Yamauchi et al. .............. 726/31 |
| 2008/0049971 A1* | 2/2008 | Ramos et al. ................. 382/100 |
| 2008/0059992 A1* | 3/2008 | Amidon et al. ................. 725/25 |
| 2009/0156170 A1* | 6/2009 | Rossano et al. ............ 455/412.1 |
| 2009/0158136 A1* | 6/2009 | Rossano et al. .............. 715/232 |
| 2009/0228583 A1* | 9/2009 | Pocklington et al. ......... 709/224 |

* cited by examiner

SYSTEM, METHOD, AND APPARATUS FOR MANAGEMENT OF MEDIA OBJECTS

BACKGROUND

Individuals often communicate or exchange information electronically, for example, using electronic mail (email), instant messaging (IM), forums, blogs, social networking sites, and text messaging. These types of electronic communication make it easy to transmit information and content between individuals and among groups.

As individuals communicate via electronic media more frequently, it becomes increasingly difficult to track the source(s) and destination(s) of the content that is communicated. In particular, it becomes difficult for a user to remember who sent the content to them initially, and to whom they have forwarded the content. Also, for content that originates with the user, it becomes difficult to remember whether or not certain content has been sent to another individual.

The difficulty in tracking content sources and destinations can have detrimental effects on the user. Congestion is one potential disadvantage to not tracking from whom content is received and to whom content is sent. In particular, the inability to effectively track such content can result in various copies of the content residing in different places among one or more communication clients. These extra copies make it more cumbersome to search through communications because the copies increase the number of items that are sorted during a search.

Additionally, potential embarrassment is another disadvantage to not tracking the source and destination of content. For example, when the source of specific content is unknown, or not tracked, it is possible for a user to send the content back to the original sender, without realizing that the content is not new to the original sender. In this example, the user may be embarrassed to learn that the user sent the content back to the person from whom the content was initially received. As another example, a user may repeatedly send the same content to a recipient, without realizing that the user has sent the same content to the same recipient already. In this example, the user may be embarrassed to learn that the user has repeatedly sent the same content to the same recipient over and over.

SUMMARY

Embodiments of a computer program product are described. In one embodiment, the computer program product includes a computer useable storage medium to store a computer readable program for tracking media object data that, when executed on a computer, causes the computer to perform operations. The operations may include storing usage data for a media object used in a first message. The usage data indicates historical usage of the media object by a user. The operations may also include recalling the stored usage data for the media object in response to associating the media object with a second message. The operations may also include communicating to the user the stored usage data corresponding to the media object prior to sending the second message with the media object to a recipient. Other embodiments of the computer program product are also described.

Embodiments of a system for tracking media object usage are also described. In one embodiment, the system includes display device and a communication client. The display device displays messages to a user. The communication client is coupled to the display device. The communication client includes a message composer and a media object tracker. The message composer facilitates composing a message from the user. The media object tracker generates usage data corresponding to the media object associated with a first message. The usage data indicates historical usage of the media object by the user. The media object tracker also recalls usage data for the media object and sends the usage data to the display device for viewing by the user in response to an association of the media object with a second message. Other embodiments of the system are also described.

Embodiments of an apparatus for tracking media object usage are also described. In one embodiment, the apparatus includes a detection engine, an entry update engine, and a lookup engine. The detection engine detects an association between a media object and a first message. The entry update engine is coupled to the detection engine. The entry update engine stores usage data in a media object directory within a data repository. The usage data indicates the association between the media object and the first message. The lookup engine is coupled to the detection engine. The lookup engine recalls the stored usage data for the media object and communicates the stored usage data to a user in response to detection of an association between the media object and a second message. Other embodiments of the apparatus are also described.

Embodiments of a computer-implemented method are also described. In one embodiment, the computer-implemented method is a method for tracking usage data for a media object. The method includes generating a log to track usage data for a media object used in a first message. The method also includes storing the usage data log on an electronic storage device coupled to a communication device. The method also includes recalling the stored usage data for the media object in response to association the media object with a second message. The method also includes communicating the user the stored usage data corresponding to the media object prior to sending the second message with the media object to a recipient. Other embodiments of the computer-implemented method are also described.

Other aspects and advantages of embodiments of the present invention will become apparent from the following detailed description, taken in conjunction with the accompanying drawings, illustrated by way of example of the principles of the invention.

DETAILED DESCRIPTION

Figure 1:
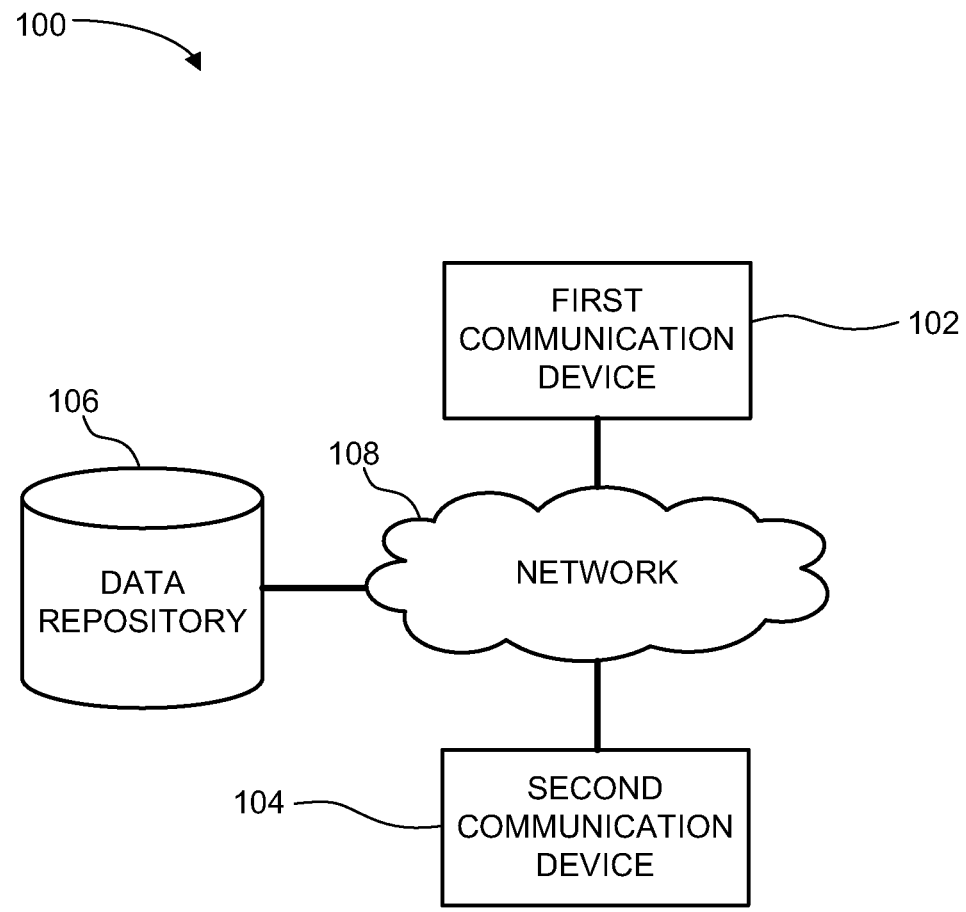
FIG. 1 depicts a schematic diagram of one embodiment of a system for communication between a first communication device and a second communication device.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments track data corresponding to a media object within a communication. In certain embodiments, a media object tracker stores a history of a media object used in communication such as email, text messaging, or instant messenger. For example, a media object may be a moving gif, a sound, music, a video clip, or picture, or an emoticon, or commonly used phrase. The history of the media file may include times and dates or other data relevant to the use and history of the media file. In certain embodiments, the tracker communicates data to a user for the media file which describes the usage of the media file. For example, the data communicated to the user may include data related to a frequency of use with respect to a certain contact, data corresponding to a source from which the user received the media object, etc.

FIG. 1 depicts a schematic diagram of one embodiment of a system 100 for tracking media object data. The system 100 includes a first communication device 102, a second communication device 104, a data repository 106, and a network 108. In some embodiments, the network 108 is an internet, intranet, LAN, WAN, or wireless network. In other embodiments, the network 108 is any other type of network to link at least two electronic devices. In some embodiments, the first and second communication devices 102 and 104 communicate across the network 108. In some embodiments, the first and second communication device 102 and 104 communicate directly. In other embodiments, the communication devices 102 and 104 communicate wirelessly, through, for example, short-range technology, or other forms of wireless or wired electronic communication. In the illustrated embodiment, the data repository 106 is coupled to the network 108. In one embodiment, the data repository 106 stores data in a central location for access from the network 108. In some embodiments, the data repository 106 is a server or other location to store data. In other embodiments, the data repository 106 is located in at least one of the first and second communication devices 102 and 104. The second communication device 104 is coupled to the network 108 and is similar to the first communication device 102. The first communication device 102 is described in further detail below.

Figure 2:
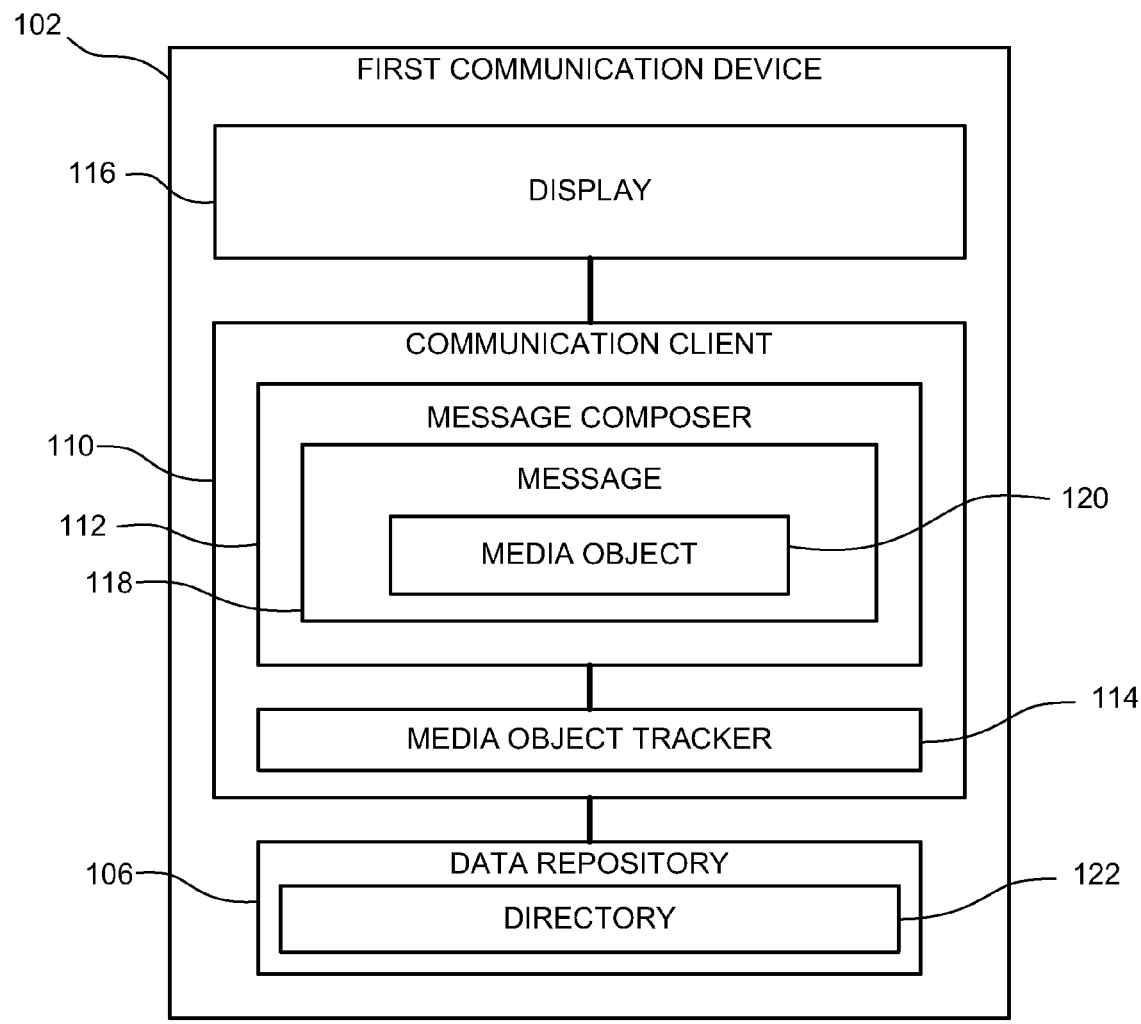
FIG. 2 depicts a schematic diagram of one embodiment of the first communication device of FIG. 1.

FIG. 2 depicts a schematic diagram of one embodiment of the first communication device 102 of FIG. 1. The first communication device 102 includes a communication client 110, a data repository 106, and a display 116 coupled to the communication client 102.

Although the depicted first communication device 102 includes the communication client 110, other embodiments of the first communication device 102 may include fewer or more clients. Additionally, at least some of the resources of each client may be shared among multiple clients. For example, some embodiments of the first communication device 102 store email, IM, text messages and related data on a single data repository (e.g., data repository 106). As another example, the messages and related data of the first communication device 102 may be stored on more than one data repository. Other configurations also may be implemented.

The data repository 106 is coupled to the communication client 110. In some embodiments, the data repository 106 is a random access memory (RAM) or another type of dynamic storage device. In other embodiments, the data repository 106 is a read-only memory (ROM) or another type of static storage device. In other embodiments, the illustrated data repository 106 is representative of both RAM and static storage memory within a single communication device 102. In other embodiments, the data repository 106 is an electronically programmable read-only memory (EPROM) or another type of storage device. Additionally, some embodiments store the instructions as firmware such as embedded foundation code, basic input/output system (BIOS) code, or other similar code.

The display 116 of the first communication device 102 is coupled to the communication client 110. In some embodiments, the display 116 is configured to generate audio tones to communicate with a user. In other embodiments, the display 116 is a graphical display such as a cathode ray tube (CRT) monitor, a liquid crystal display (LCD) monitor, or another type of display device. In one embodiment, the display 116 is configured to convey a representation of a media object history, a confirmation message, or a media object data interface. Additionally, the display 116 may be configured to communicate to the user, through audio, video, or other perceptible communications. Other functions related to the media object 120 are discussed below in further detail.

The media object tracker 114 is coupled to the communication client 110. The media object tracker 114 is configured to track and organize data for a media object 120 used in a message 118 such as text, IM, email, etc. The media object tracker 114 is described in further detail below with reference to FIG. 3.

The communication client 110 is coupled to the display 116, the data repository 106, and the media object tracker 114. In some embodiments, the communication client 110 is an instant messenger, email, text, or other type of synchronous or asynchronous communication between the first communication device 102 and the second communication device 104. The communication client 110 includes a message composer 112. The message composer 112 is configured to facilitate the generation of a message 118. For example, the message composer 112 may allow a user to insert text, drag-and-drop a media object 120, or compose a message through other actions.

The message 118 is a form of communication that corresponds to the message composer 112 of the communication client 110. For example, the message 118 may be an email, instant message, text message, or other type of electronic communication that corresponds to the communication client 110. In some embodiments, the message 118 is a synchronous message. In other words, in one embodiment, the message 118 is an instant communication to be sent to a recipient and received directly after the user sends the message 118. One example of a synchronous message is an instant message (IM). In another embodiment, the message 118 is an asynchronous message. In other words, in another embodiment, the message 118 is a message that is sent to a recipient without the requirement that the recipient be online or otherwise ready to immediately receive the message 118. One example of an asynchronous message is an email that is sent to a recipient and then read by the recipient the day after the message 118 was sent.

The message 118 includes a media object 120. In one embodiment, the media object 120 is attached to the message 118. In another embodiment, the media object 120 is embedded within the message 118. Other embodiments include other manners of connecting the media object 120 with the message 118. In some embodiments, the media object 120 is stored in a central location on the network 108 for access from multiple electronic devices that can be coupled to the network 108. In another embodiment, the media object 120 is stored locally on the first communication device 102. In some embodiments, the media object 120 is added to the message 118 by typing a string into the message 118. In another embodiment, the media object 120 is added to the message 118 by dragging the media object 120 from a storage location and dropping it onto the message composer 112. Other embodiments include other ways of associating the media object 120 with the message 118.

Figure 3:
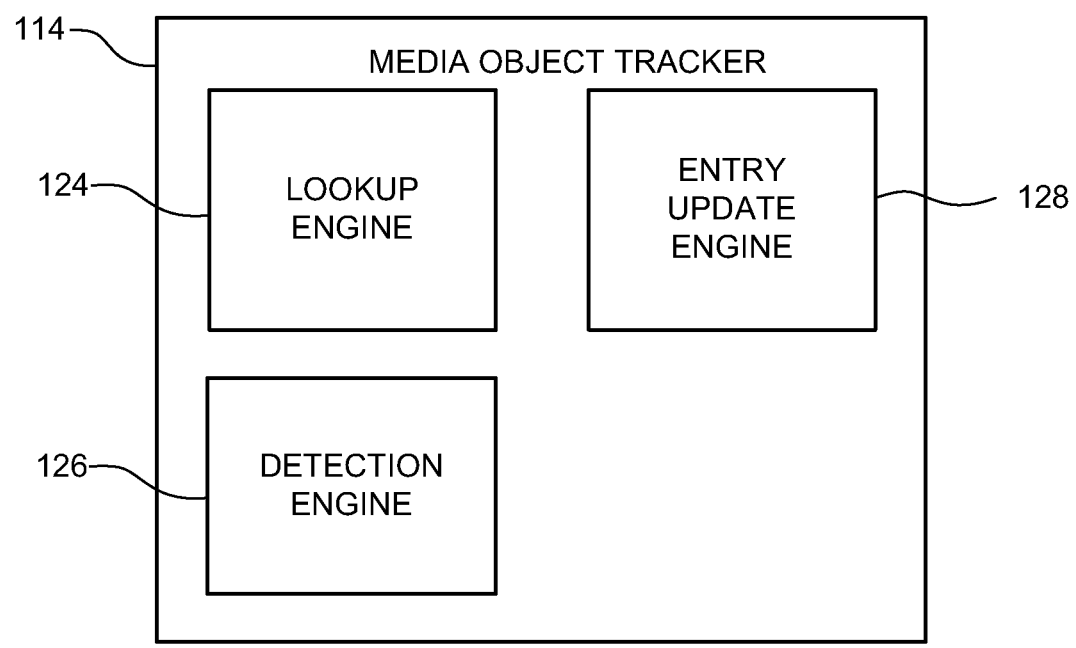
FIG. 3 depicts a schematic diagram of one embodiment of the media object tracker of FIG. 2.

FIG. 3 depicts a schematic diagram of one embodiment of the media object tracker 114 of FIG. 2. In the illustrated embodiment, the media object tracker 114 includes a lookup engine 124, a detection engine 126, and an entry update engine 128. The detection engine 126 is configured to detect the media object 120 in the message 118. The detection engine 126 activates the lookup engine 124 upon detection of the media object 120. In one embodiment, the detection engine 126 is configured to use a recognition protocol to detect the media object 120. For example, the detection engine 126 might communicate with software that is attaching the media object 120. The attaching software recognizes that the media object is stored as a separate part of the message 118 and reports the information to the detection engine 126. In other embodiments, the detection engine 126 is configured to recognize a file type or extension, for example, .gif, .jpeg, .bmp, etc.

The lookup engine 124 is coupled to the detection engine 126 and is configured to access data from the directory 122 upon detection of a media object 120 by the detection engine 126. In some embodiments, the lookup engine 124 is configured to verify that the media object 120 has data corresponding to the media object 120 stored in the directory 122. In some embodiments, the data for the media object 120 is stored after the media object 120 has been received, when the user enters data corresponding to the media object 120, or when the media object 120 is detected in a message 118.

In one embodiment, the media object tracker 114 may be incorporated into the first communication device 102 separately from the communication client 110. In this embodiment, the first communication device may include a client interface (not shown) to facilitate communication between the communication client 110 and the media object tracker 114. The client interface might be coupled to the lookup engine 124. The client interface is configured to interface with the communication client 110. In this embodiment, the client interface is configured to notify a user of a detection of the media object 120 associated with the message 118. An exemplary configuration of the client interface might display a visual notification corresponding to the media object 120 on a display 116 in a separate window or a separate viewing space within a graphical-user interface of the communication device 102. For example, media object tracker 114 may be configured to display an instant message on the display 114, via the client interface. For example, the instant message may be shown in a pop-up window. Alternatively, the instant message may be shown in a pane, or tile, of another viewing space such as the email viewing space. In some embodiments, the client interface is configured to display a notification on the header of the email client or a column of the header to indicate to the user the history of the media object 120. In one embodiment, the instant message is a short messaging service (SMS) text message, or some other type of message, that is sent to and displayed on the display 116 of a computer, (not shown), cell-phone (not shown), personal digital assistant (PDA, not shown), or some other similar communication device.

Figure 4:
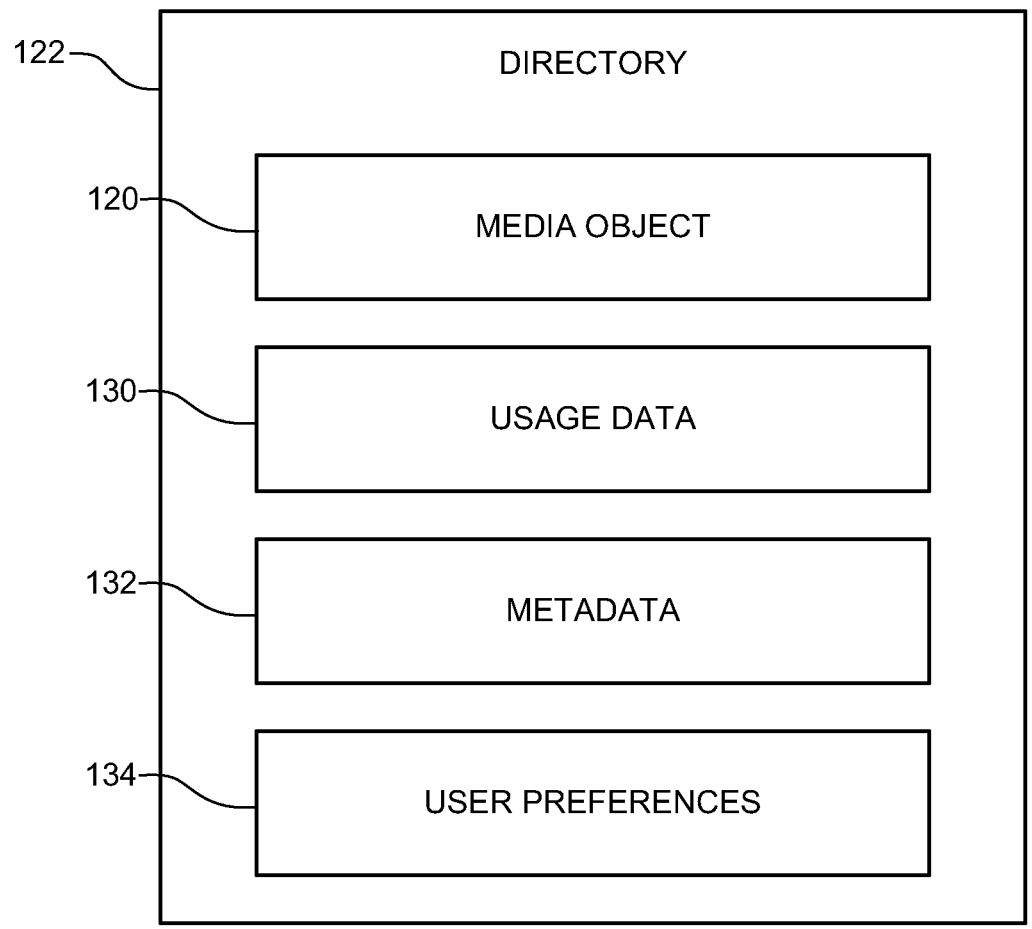
FIG. 4 depicts a schematic diagram of one embodiment of the directory of FIG. 2.

FIG. 4 depicts a schematic diagram of one embodiment of the directory 122 of FIG. 2. In one embodiment, as described previously with respect to FIG. 2, it may be advantageous to store the directory 122 locally in the data repository 106 of the first communication device 102 to allow for quicker access to the directory 122 or to compose the message 118 before accessing the network 108 to send the message 118. In contrast, the embodiment in which the directory 122 is stored in the data repository 106 (connected to the network 108 as depicted in FIG. 1) may facilitate a user to have access to data stored in the directory 122 from multiple communication devices connected to the network 108. The directory 122 contains data pertaining to the media object 120.

The illustrated embodiment of FIG. 4, the directory 122 includes the media object 120, usage data 130, metadata 132, and user preferences 134. Embodiments of the directory 122 may include fewer or more types of data stored in the directory 122. In some embodiments, the media object 120 is stored to the directory 122 by the media object tracker 114. Other embodiments allow the user to store the media object 120 to the directory 122. In some embodiments, the media object 120 is an image, sound, or movie. Other embodiments may include other types of media objects 120. The usage data 130 includes data corresponding to the usage of the media object 120. For example, usage data 130 may include data corresponding to a frequency of use of the media object 120, a frequency in which the media object 120 has been sent to a given recipient, and time and date data corresponding to when the media object 120 was received. Other embodiments may include other types of usage data 130.

The metadata 132 includes data corresponding to the media object 120. In some embodiments, the metadata 132 is identifier data. For example, metadata 132 for a media object 120 that is a .gif of a butterfly may include identifier tags such as insect, bug, spring, summer, suitable for children, girl, happy, etc. Other embodiments of the metadata 132 include other types of metadata corresponding to the media object 120. The user preferences 134 is data stored in the directory 122 that corresponds to at least one user preference for the media object 120. In some embodiments, the user preferences 134 are specific to the media object 120. In other embodiments, the user preferences 134 apply to more than one media object or type of media object. In some embodiments, the user preferences 134 might include, for example, sending rules like "Don't send this to Bill," "Sally doesn't like moving gifs," "Tell me when I have sent this jpg to more than four people," etc. Other embodiments include other types of user preferences 134.

Figure 5A:
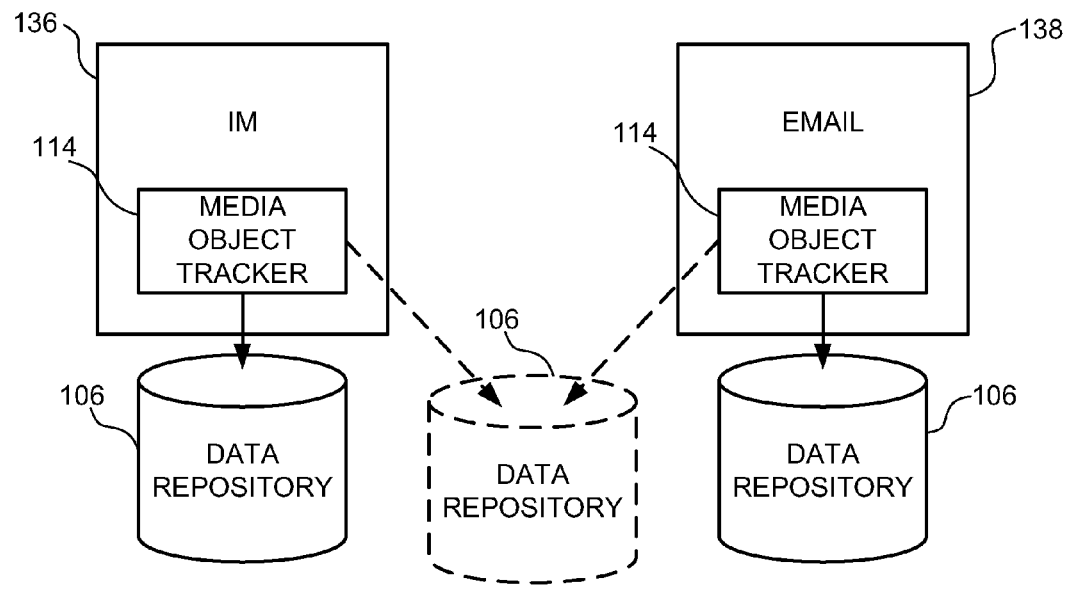
FIGS. 5A and 5B depict embodiments of alternative arrangements of the data repository and media object tracker of FIGS. 1 and 2.
Figure 5B:
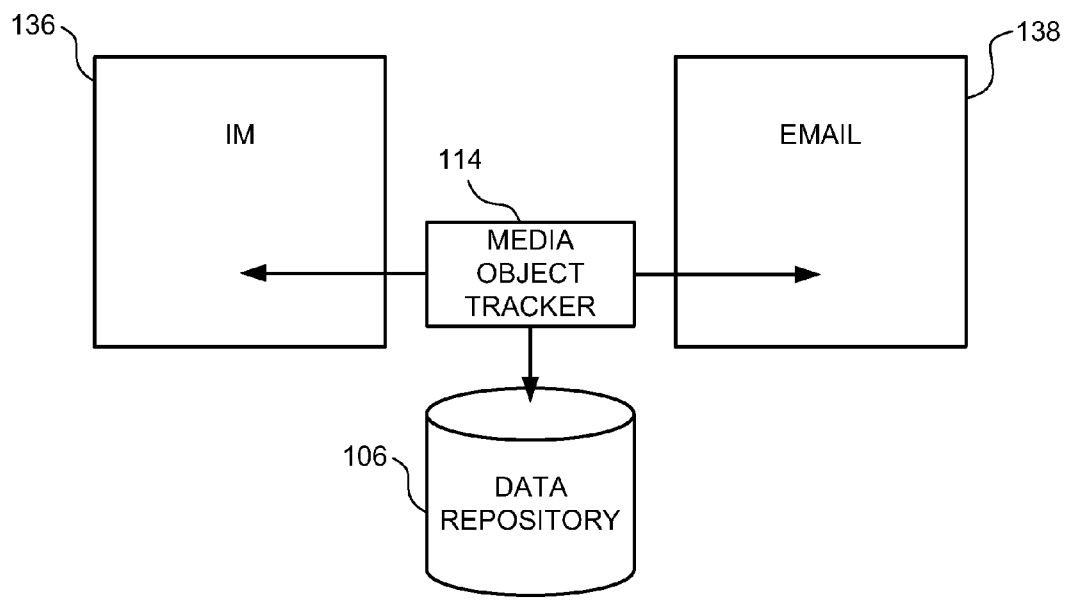

FIGS. 5A and 5B depict schematic drawings of alternative embodiments for the data repository 106 of FIGS. 1 and 2. FIG. 5A depicts one embodiment in which the data repository 106 is unique to each media object tracker 114 of an IM 136 and an Email 138 or shared by both media object trackers 114 of FIG. 5A. Other embodiments implement other arrangements of the data repository 106. FIG. 5B illustrates one embodiment in which the media object tracker 114 is shared by the IM 136 and Email 138. In this embodiment, the media object tracker 114 of FIG. 5B is coupled to the data repository 106. Other embodiments include other arrangements of the media object tracker 114 and data repository 106.

Figure 6:
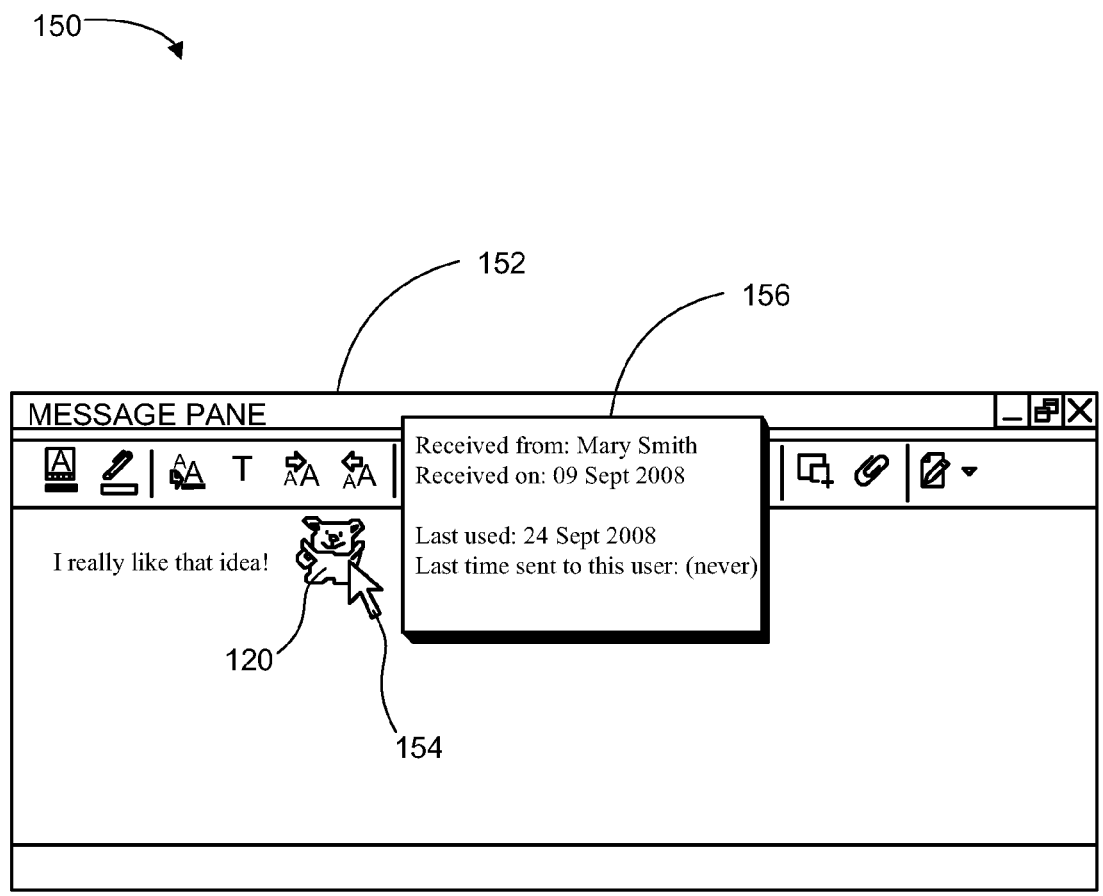
FIG. 6 depicts one embodiment of a message pane within a graphical user interface.

FIG. 6 depicts one embodiment of a message pane 152 within a graphical user interface 150. FIG. 6 includes a message pane 152, a media object 120, a cursor 154, and a display box 156. The illustrated embodiment of the graphical interface 150 of FIG. 6 depicts what a user might see on the display 116 of the first communication device 102. In particular, the message pane 152, for example, may be an instant messenger chat pane, an email composition window, a text window, or other message generation space. In the depicted embodiment, the media object 120 is embedded into the text portion of the message pane 152. The cursor 154 is depicted as hovering over the media object 120. In some embodiments, the display box 156 is generated in response to the user hovering the cursor 154 over the media object 120. In another embodiment, the display box 156 is generated by clicking on the media object 120. In another embodiment, the display box 156 is generated by dragging the media object 120 into the message pane 152. In another embodiment, the display box 156 is generated upon detection of the media object 120 in the message pane 152.

Figure 7:
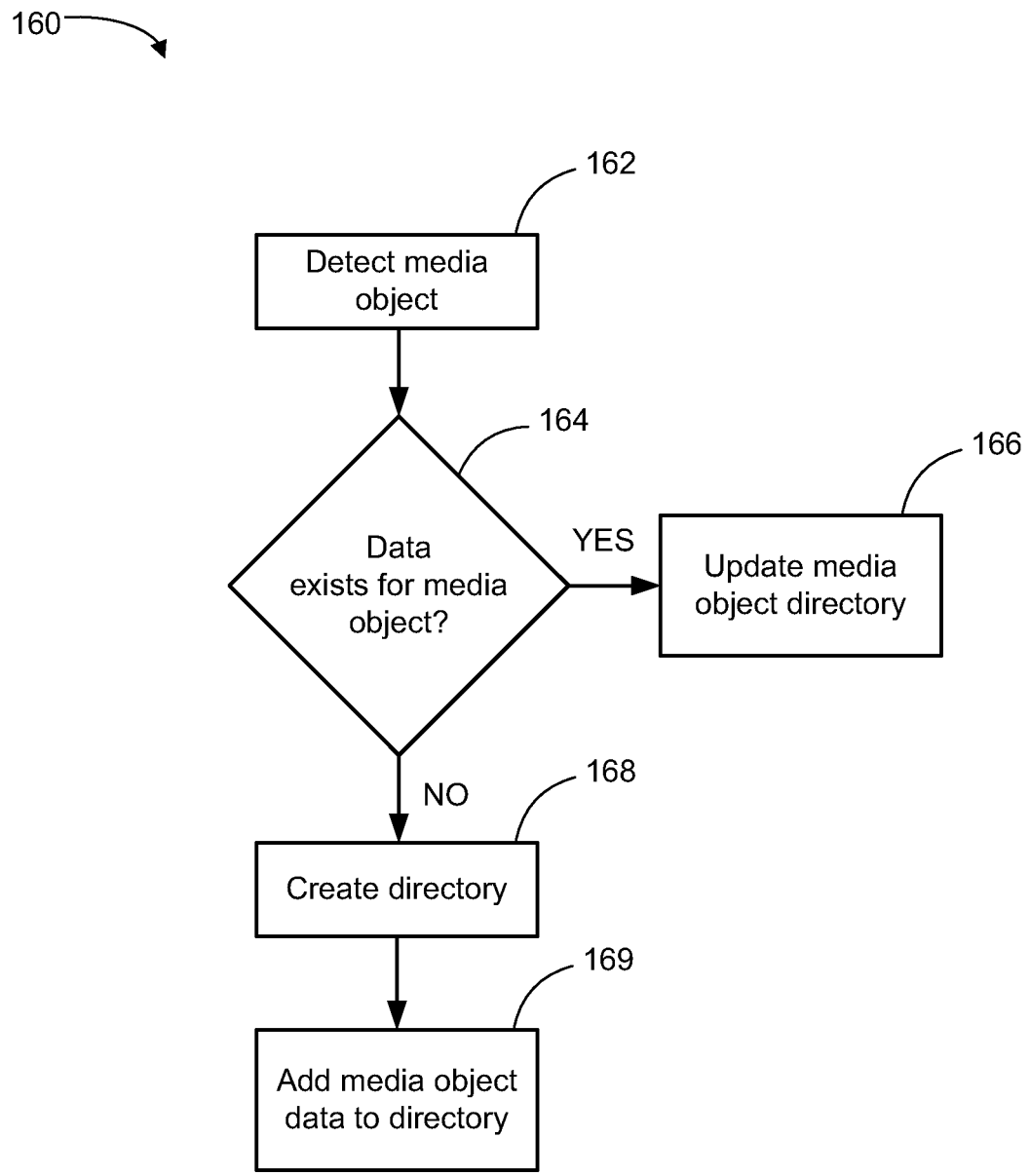
FIG. 7 depicts a flowchart diagram of one embodiment of a method for generating data for a media object of FIG. 2.

FIG. 7 depicts a flowchart diagram of one embodiment of a method 160 for generating data for a media object 120 of FIG. 2. In the depicted embodiment, the detection engine 126 detects 162 the media object 120. The lookup engine 124 then determines 164 if data exists in the directory 122 for the media object 120. If data is determined 164 to exist for the media object 120 the entry update engine 128 updates 166 the data stored for the media object 120 in the directory 122. If it is determined 164 that no data exists for the media object 120 the entry update engine 128 creates 168 an entry for the media object 120 in the directory 122. The entry update engine 128 then adds 169 media object data to the directory 122.

Figure 8:
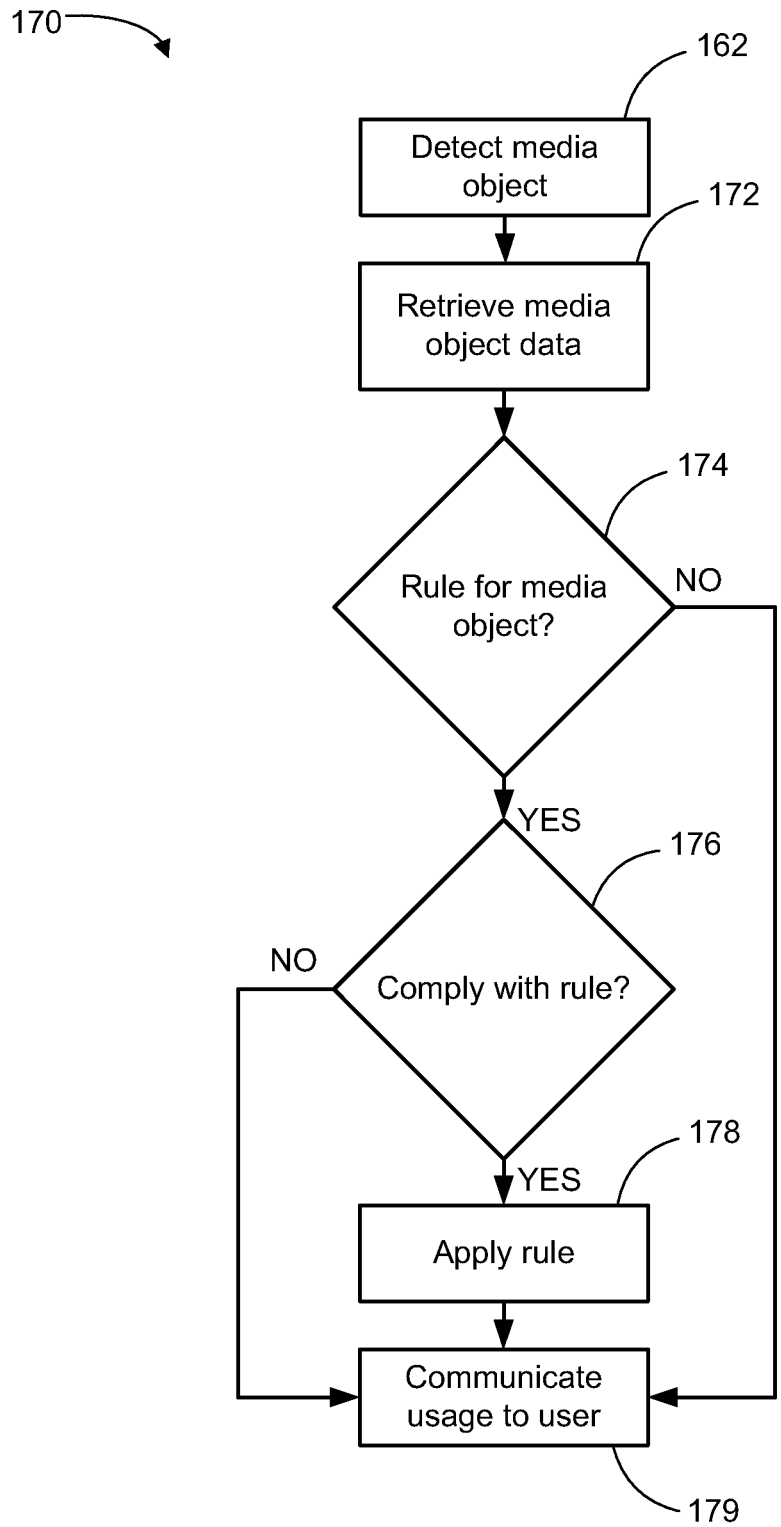
FIG. 8 depicts a flowchart diagram of one embodiment of a method for managing a media object of FIG. 2.

FIG. 8 depicts a flowchart diagram of one embodiment of a method 170 for managing a media object 120 of FIG. 2. In the illustrated embodiment, the detection engine 126 detects 162 the presence of the media object 120. The lookup engine 124 then retrieves 172 data for the media object 120 from the directory 122. The lookup engine 124 then determines 174 if there is a rule for the media object 120 stored in the directory 122. If there is no rule stored for the media object 120, the display communicates 179 the usage data of the media object 120 to the user. If it is determined 174 that there is a rule for the media object 120, then it is determined 176 if the rule corresponding to the media object 120 will be followed. In one embodiment, the option to comply with the rule governing the media object 120 is displayed to the user. In another embodiment, the lookup engine 124 determines whether to comply with the rule. If it is determined 176 to not comply with the rule, the display communicates 179 the usage data of the media object 120 to the user. If it is determined 176 to comply with the rule, the rule is applied 178. Then the display communicates 179 the usage data of the media object 120 to the user.

Figure 9:
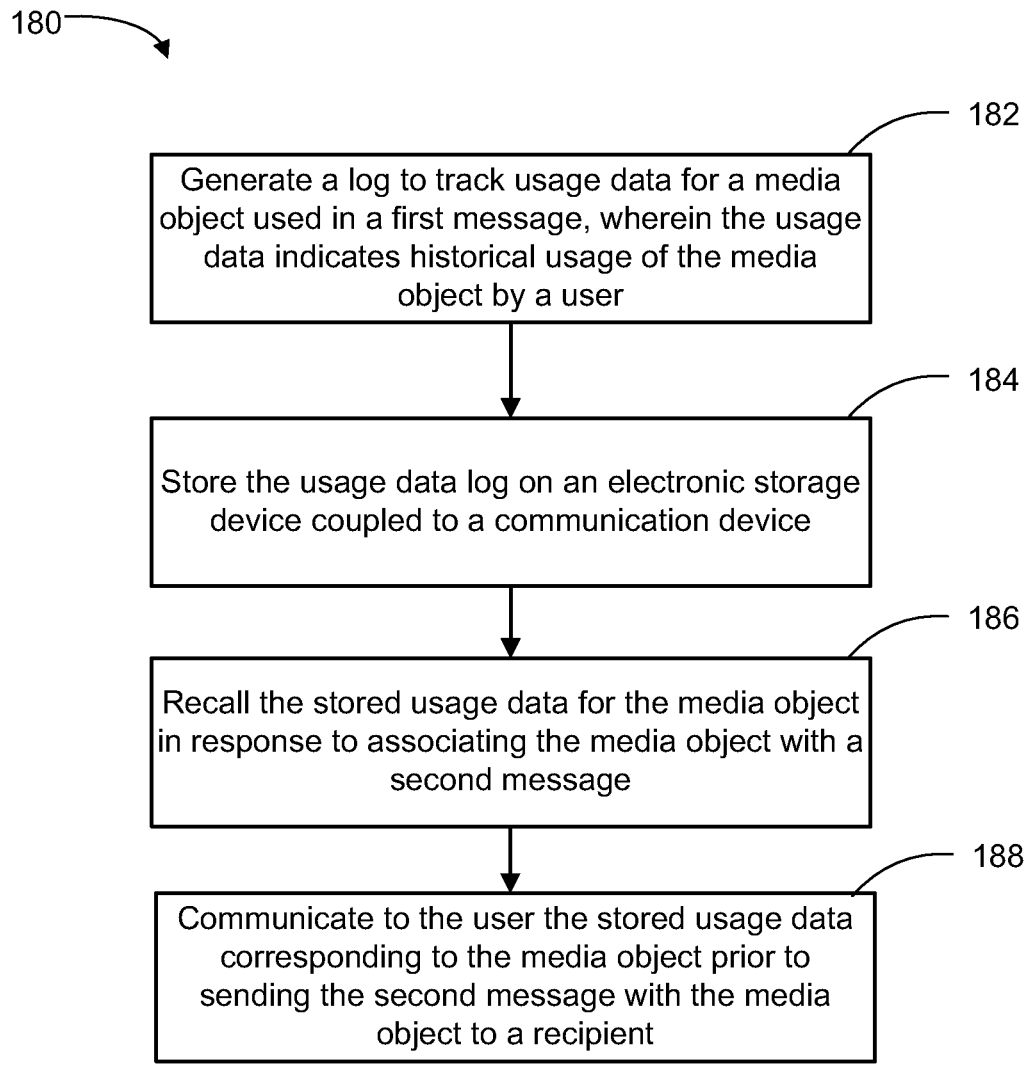
FIG. 9 depicts a flowchart diagram of one embodiment of a method for tracking data for the media object of FIG. 2.

FIG. 9 depicts a flowchart diagram of one embodiment of a method 180 for tracking data for a media object 120. The method 180 includes generating 182 a log to track usage data for a media object 120 used in a first message 118. The usage data indicates historical usage of the media object 120 by a user. The method 180 also includes storing 184 the usage data log on an electronic storage device couple to a communication device. The method 180 also includes recalling 186 the stored usage data for the media object 120 in response to associating the media object 120 with the second message. The method 180 also includes communicating 188 to the user the stored usage data corresponding to the media object 120 prior to sending the second message with the media object 120 to a recipient.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of a combination of hardware and software elements. In one embodiment, the invention is implemented in an electronic storage device containing software, which includes but is not limited to firmware, resident software, microcode, etc. Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can contain or store the program for use by or in connection with the instruction execution system, apparatus, or device. Further, the computer-useable or computer-readable storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program for tracking media object data, wherein the computer readable program, when executed on a computer, causes the computer to perform operations comprising:
    storing usage data for a media object used in a first communication message, wherein the usage data indicates historical usage of the media object in the first message involving a user;
    attaching, using software, the media object to a second communication message;
    determining, by the software, that the media object is attached in a separate part of the second communication message and reporting, by the software, to a detection engine, that the media object is attached in a separate part of the second communication message;
    activating by the detection engine a lookup engine and recalling, by the lookup engine, the stored usage data for the media object in response to determining that the user interaction with the media object in association with the second communication message composed by the user; and
    communicating to the user the stored usage data corresponding to the media object prior to sending the second message with the media object to a recipient.

2. The computer program product of claim 1, wherein the operation to store the usage data comprises storing the data to a usage data repository coupled to the computer.

3. The computer program product of claim 1, wherein the operation to store the usage data comprises storing the usage data to a data repository connected to the computer via a network.

4. The computer program product of claim 1, wherein the operation to store the usage data comprises storing a date on which the media object was received by the user.

5. The computer program product of claim 1, wherein the operation to store the usage data comprises storing a time at which the media object was received by the user.

6. The computer program product of claim 1, wherein the operation to store the usage data comprises storing a source identifier to identify a sender of the media object.

7. The computer program product of claim 1, wherein the operation to store the usage data comprises storing a recipient identifier to identify a previous recipient of the media object from the user.

8. The computer program product of claim 1, wherein the operation to store the usage data comprises storing user input commentary corresponding to the media object.

9. The computer program product of claim 1, wherein the computer readable program, when executed on the computer, causes the computer to perform further operations comprising storing a user-defined rule to control a relationship between the media object and the recipient.

10. The computer program product of claim 1, wherein the computer readable program, when executed on the computer, causes the computer to perform further operations comprising detecting, by the software, a user action to attach the media object to the second message.

11. The computer program product of claim 1, wherein the computer readable program, when executed on the computer, causes the computer to perform further operations comprising detecting, by the software, a user action to embed the media object within a body of the second message.

12. The computer program product of claim 1, wherein the computer readable program, when executed on the computer, causes the computer to perform further operations comprising detecting, by the software, a user action to hover a cursor over the media object on a display device.

13. The computer program product of claim 1, wherein the computer readable program, when executed on the computer, causes the computer to perform further operations comprising recognizing a user action to select the media object with a cursor on a display device as the user interaction with the media object.

14. A computer implemented method for tracking usage data for a media object, the method comprising:
    generating a log to track usage data for a media object used in a first communication message, wherein the usage data indicates historical usage of the media object in the first message involving a user;
    storing the usage data log on an electronic storage device coupled to a communication device;
    attaching, using software, the media object to a second communication message;
    determining, by the software, that the media object is attached in a separate part of the second communication message and reporting, by the software, to a detection engine, that the media object is attached in a separate part of the second communication message;
    activating by the detection engine a lookup engine and recalling, by the lookup engine, the stored usage data for the media object in response to determining that the user interaction with the media object in association with the second communication message composed by the user; and
    communicating to the user the stored usage data corresponding to the media object prior to sending the second message with the media object to a recipient.

15. The computer implemented method of claim 10, wherein recalling the stored data for the media object further comprises initiating a data retrieval process in response to a trigger event, wherein the trigger event comprises an action to attach the media object to the second message or to embed the media object within the second message.

16. The computer implemented method of claim 10, wherein recognizing the user interaction with the media object further comprises detecting, by the software, a first user action to attach the media object to the second message or detecting, by the software, a second user action to embed the media object within the second message.

17. The computer implemented method of claim 10, wherein recognizing the user interaction with the media object further comprises detecting, by the software, a user action to hover a cursor over the media object on a display device.

18. The computer implemented method of claim 10, wherein recognizing the user interaction with the media object further comprises detecting, by the software, a user action to select the media object with a cursor on a display device.

* * * * *